United States Patent Office 2,722,101
Patented Nov. 1, 1955

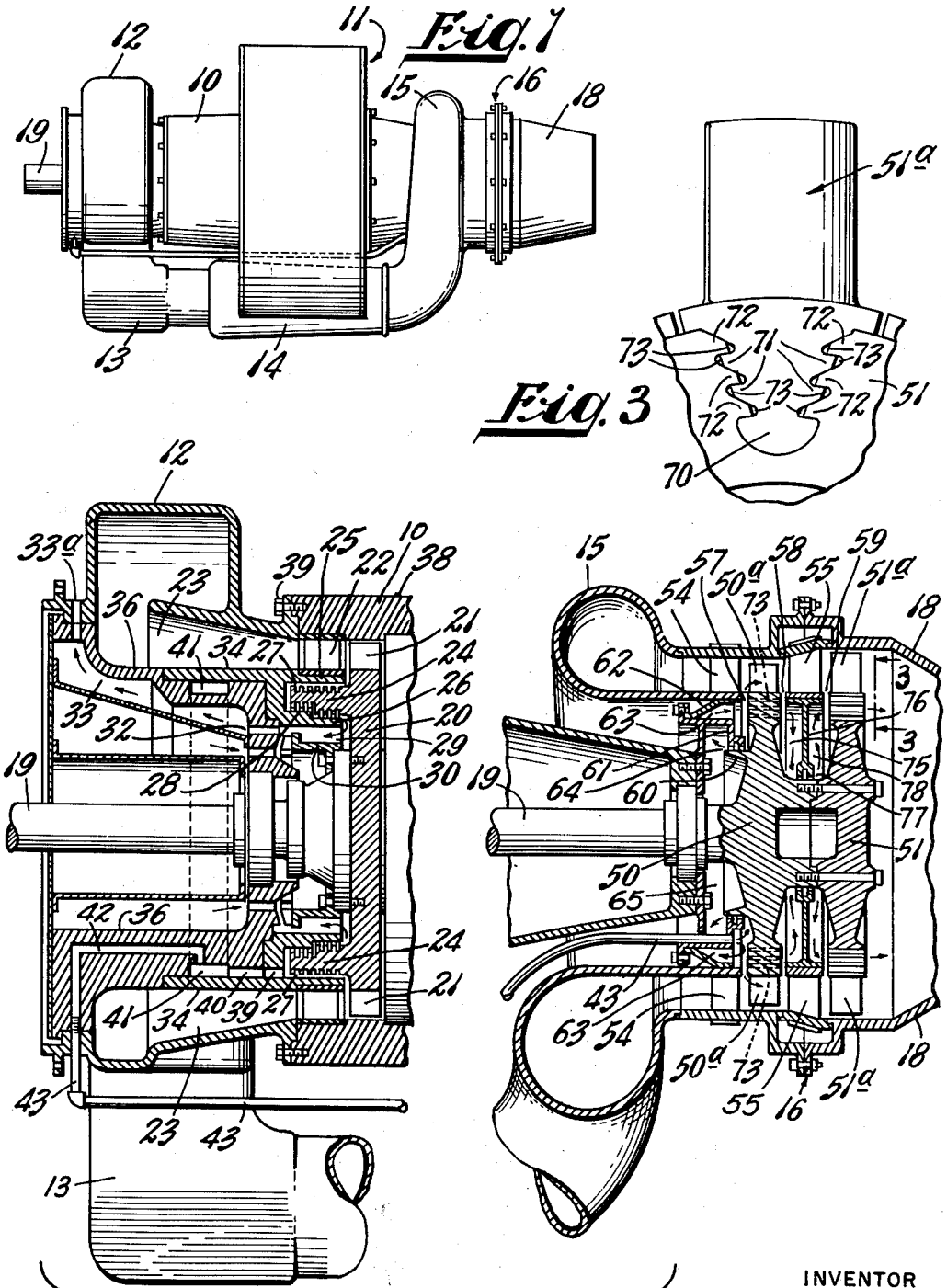

2,722,101

GAS TURBINE SEALING AND COOLING STRUCTURE

Leon R. Wosika, San Diego, Calif., assignor to Solar Aircraft Company, San Diego, Calif., a corporation of California Application December 21, 1948, Serial No. 66,534

5 Claims. (Cl. 60—39.66)

This invention relates to gas turbines of the type comprising an air compressor rotor and a gas turbine rotor mounted on a common shaft whereby the compressor is driven by the turbine to supply combustion air for the burning of fuel to produce the gas that drives the turbine.

An object of the invention is to facilitate the cooling of the gas turbine rotor.

Another object is to prevent leakage of the hot gases of combustion that are directed axially through the turbine blades from leaking radially into the interior of the turbine and causing excessive heating and contamination.

Another object is to attain the aforegoing objects without resort to external sources of cooling air or the like.

Another object is to utilize leakage air from the compressor for cooling the turbine of a gas turbine unit.

Another object is to provide a particularly effective design of turbine wheel and vane assembly which facilitates the cooling of the structure.

Other more specific objects and features of the invention will become apparent from the description to follow.

Briefly, an important feature of the present invention is the use of leakage air from the air compressor of a gas turbine to provide cooling of the turbine elements. In a vane-type axial flow air compressor such as are in common use in gas turbine units, it is necessary to provide a seal between the rotor and the stator at the discharge end of the compressor in order to prevent leakage of air to the atmosphere. It is common to provide for this purpose a seal providing a tortuous path through a thin gap between the relatively rotating parts. Of course such seals do not prevent leakage, but merely maintain it at a sufficiently low value to make the air wastage small as compared to the total volume of air delivered by the compressor. The pressure drops rather uniformly from one end to the other of the tortuous path through the seal, and in accordance with the present invention the seal is tapped intermediate the ends of this flow path so that some of the leakage air is taken off at an intermediate pressure below the full compressor output pressure but substantially above the ambient atmospheric pressure. This air at intermediate pressure is then delivered through a suitable pipe to the turbine end of the structure, where it is conducted to the rim of the turbine wheel in such a manner as to cool the latter and also maintain a pressure above that of the hot gases passing through the turbine vanes, whereby there is a leakage of air through the clearance spaces of the turbine into the path of the hot gases and out to exhaust instead of a reverse leakage of hot gases through the turbine clearances into the interior portions of the turbine.

In the drawing:

Fig. 1 is a plan view of a gas turbine assembly in which the invention is incorporated;

Fig. 2 is a horizontal axial section through the compressor and turbine ends of the assembly of Fig. 1 with the center portions omitted;

Fig. 3 is a detail elevational view taken in the plane 3—3 of Fig. 2.

Referring to Fig. 1, there is shown in simple outline a gas turbine of axial flow type comprising an air compressor 10 which receives atmospheric air at the right end as indicated by the arrow 11, compresses it, and delivers it through a scroll 12 and a pipe 13 to a combustion chamber 14 where it is mixed with a suitable fuel and burned, the products of combustion being delivered to a gas turbine 16 through a scroll 15. After passing through the gas turbine 16, the gases are exhausted to atmosphere through an exhaust nozzle 18. Both the rotor of the air compressor 10 and the rotor of the turbine 16 are mounted on a common shaft 19 which is seen projecting from the left end of the assembly in Fig. 1.

Referring to Fig. 2, the left end of the compressor rotor 20 is shown and the last set of rotor vanes 21. The rotor 20 and vanes 21 may be of conventional construction and their design does not constitute a part of the present invention. The main body of the air, at pressure substantially above atmospheric, delivered through the last set of rotor vanes 21 is discharged through a set of stationary stator vanes 22 through an expanding annular passage 23 and into the discharge scroll 12.

Because of the fact that the air leaving the rotor vanes 21 is above atmospheric pressure, it tends to leak between the rotating and stationary parts of the machine. To reduce this leakage to as small a value as practicable, a seal construction is provided. This seal comprises an annular flange 24 which is formed integrally with and projects axially from the rotor 20 adjacent the rim thereof. This flange 24 is provided with alternate ridges and grooves on its inner and outer surfaces to increase the resistance to air flow therealong and fits into an annular groove defined by an outer wall 25 and an inner wall 26 on the stator structure. Hence the flange 24 defines with the outer stator wall 25 a clearance space 27, and defines with the inner wall 26 a clearance space 28 which are in series with respect to the leakage flow and are made as small radially as is practicable and still maintain clearance between the rotating and stationary parts. The leakage air after leaving the right end of the clearance space 28 flows radially inwardly, then axially to the left through a passage 29 defined between a collar element 30 on the rotor 20 and the inner surface of the wall 26, and then escapes through a series of holes 32 in the stator and through a passage 33 and an aperture 33a to atmosphere. The stationary stator walls 25 and 26 are formed integrally with a stator element 34 that has an inner annular surface fitting closely with an annular stator element 36 that in turn is fitted closely at its left end to the scroll 12, the latter being secured to the main compressor casing 38 as by screws 39.

The structure so far described does not constitute a part of the present invention, the latter residing in the design whereby a portion of the air leaking through the clearance space 27 is utilized for cooling of the gas turbine structure.

Thus referring to Fig. 2, it will be observed that at the lower side of the compressor an axial hole 39 is provided in the member 34 which communicates the left end of the annular groove defined by the stator walls 25 and 26 with a connecting groove 40 in the stator element 36, which in turn communicates with an annular passage 41 defined by a groove in the outer surface of the stator element 36 and the inner wall of the stator element 34. This annular passage 41 is connected by a passage 42 in the stator element 36 to a pipe 43 which extends to the gas turbine end of the machine.

Since the two series leakage paths 27 and 28 defined between the flange element 24 and the walls 25 and 26 respectively, are of approximately equal length the pressure drop between each of said passages 27 and 28 is approximately the same. Therefore air is bled off through the hole 39 at a pressure substantially halfway between the pressure at the output of the compressor and atmospheric pressure. In practice, the compressor output pressure may be about 70 p. s. i. and the pressure of the air delivered through the passage 39 may be about 33 p. s. i. The air circulates through the annular passage 41 to a certain extent and is somewhat cooled, so that the air delivered to the pipe (or several such pipes) 43 may be at a temperature of approximately 300° F. and at the previously mentioned pressure of 33 p. s. i. which latter pressure, due to the pressure drop in the turbine driving gases because of conversion of pressure to velocity head in stator blades 54, is sufficiently high to accomplish the purposes of this invention.

Referring now to Fig. 2, which discloses in section the turbine portion of the machine, there is mounted on the rear end of the shaft 19 a pair of turbine rotor sections 50 and 51 respectively, which have rotor vanes 50a and 51a respectively on their peripheries through which the gaseous products of combustion from the scroll 15 are delivered. The gases from the scroll first pass through a set of stator vanes 54 and impinge upon the rotor vanes 50a, after which they pass through and are redirected by a second set of stator vanes 55 and are redirected thereby against the second set of blades 51a of the rotor, after which they pass through the exhaust nozzle 18. Obviously there must be clearance space between the rotor and stator structures at the annular spaces 57, 58, and 59, and if no provision was made for preventing it, the products of combustion which pass through the turbine blades and are necessarily somewhat above atmospheric pressure would tend to leak through these spaces 57, 58, and 59 into the interior portions of the turbine, causing excessive heating thereof and possibly corrosion. To prevent such undesirable effects, the present invention utilizes the air at superatmospheric pressure delivered from the compressor through the pipe 43 to provide a higher pressure interior of the clearances 57, 58, and 59 than exists exterior thereof, whereby instead of there being a flow of hot combustion gases into the interior of the turbine, there is a counterflow of relatively cool air.

To this end, there is provided on the rotor 50 and extending leftward therefrom an annular flange 60, the exterior surface of which has a close running fit with a stationary stator part 61. This stator part 61, together with a cooperating expansible stator part 62, and the rotor 50 defines an annular space 63 which is closed except for the clearance 57 and the labyrinth seal passage 64 between the rotor flange 60 and the stator part 61 which leads to a dead air chamber 65 preventing flow along shaft 19 and thus protecting shaft 19 and the surrounding areas and parts from the turbine heat. The pipe 43 delivers air into this annular space 63.

The air entering the space 63 from the pipe 43 is directed against and impinges upon the side of the turbine rotor 50 thereby receiving a swirling action which circulates the air within the space 63 giving good cooling characteristics throughout the circumference of the turbine rotor. This circulation has the important feature of inhibiting the rotation of the air with the turbine rotor so, that it will neither stratify with the rotor nor remain still but is kept in a continuous swirl and motion, considerably increasing its effectiveness in heat transfer.

Part of the air entering the annular space 63 escapes through the clearance 64 and performs no useful purpose. Another part escapes through the clearance 57 and its movement outward through this clearance path serves the useful function of not only cooling the clearance surfaces but of preventing inward flow therethrough of the hot products of combustion. Another part escapes through passages 73 provided in the outer portion of the turbine rotor 50, which passages are illustrated in Fig. 3.

Fig. 3 is a view of the rear rotor section 51 but the front rotor section 50 is of the same construction. It will be observed from Fig. 3 that the rotor 51 is formed separately from the rotor vanes 51a and joined thereto by what is known as a fir tree base 70 on the vane 51a which engages with a cooperating axially extending groove in the rim of the rotor 51. Thus the fir tree base 70 of each vane is provided with axially extending ridges 71 which engage axial grooves provided therefor in the rotor 51, the latter having cooperating ridges 72 which engage grooves defined in part at least by the ridges 71 on the fir tree base 70. In accordance with the present invention, the outer ends or edges of the ridges 71, and the inner edges of the ridges 72 are truncated, so that they do not extend clear to the bottoms of the grooves in which they fit but instead define therewith the plurality of small air passages 73 extending axially through the rotor from one side to the other.

The left ends of the passages 73 in the rotor section 50 communicate with the space 63 containing air substantially above atmospheric pressure as previously described, so that a portion of this air flows from left to right through the grooves 73 into an annular space 75 defined between the right side of the rotor section 50 and the supporting web 76 for the stator blades 55. This web 76 has a running clearance 77 at its inner end with the rotor structure, through which part of the air escapes into a corresponding annular space 78 defined between the web 76 and the rotor section 51. The remainder of the air entering the space 75 escapes through the clearance 58, performing the same function as that escaping through the clearance 57. The air entering the annular space 78 through the clearance 77 escapes in part through the clearance 59 and in part through the passages 73 in the rotor 51. The flow of air through the passages 73 in both rotors facilitates the removal of heat from the rotors adjacent their peripheries where they are exposed to the hot exhaust gas.

It will be apparent, therefore, that the invention provides useful cooling of the turbine parts, and prevents entry of the hot and corrosive combustion gases into the interior of the turbine by the utilization of leakage air from the compressor seal that would otherwise be wasted.

An important advantage of the invention is that the leakage air from the compressor is at a relatively high pressure, so that the pipe 43 for conducting it to the turbine does not need to be of large diameter.

Although for the purpose of explaining the invention, a particular embodiment thereof has been shown and described, obvious modifications will occur to a person skilled in the art, and I do not desire to be limited to the exact details shown and described.

I claim:

1. In a gas turbine power plant comprising a compressor having a leakage path to the atmosphere for sealing the discharge side of said compressor, a burner supplied with air by said compressor, a turbine driven by the hot gases issuing from said burner, located adjacent the inlet side of said compressor, and having the usual turbine rotor running clearances surrounding its moving elements: a sealing structure at the inlet side of said turbine to prevent free communication between said turbine rotor clearances and the atmosphere at said inlet side; and a separate fluid conduit having one end connected to said compressor leakage path at a point between its ends and its other end connected to said turbine sealing structure whereby the normally wasted, leakage air at super ambient pressure in said compressor leakage path is fed to the turbine sealing structure and rotor clearances to prevent entry of the said hot gases into the turbine clearances whereby harmful overheating of said turbine rotors and related parts is prevented.

2. The combination defined in claim 1 wherein said one end of said conduit is connected to that predetermined point in said leakage path which assures the maintenance of a pressure in said turbine rotor clearances just sufficiently above that of said hot gases to assure a slight flow of air through said turbine clearances and into the path of flow of said hot gases without interfering with the efficient flow of said hot gases whereby excessive heating of the air in said turbine rotor clearances is avoided and the cooling effect of said flowing air is effective to overcome heat conduction into the rotor body.

3. The combination defined in claim 1 wherein said turbine comprises a multi-stage unit having spaced interconnected rotors having axial passages adjacent the rotor rims communicating at their opposite ends with the running clearances on each side of their respective rotors whereby the successive downstream running clearances are placed in communication with one another.

4. The combination of claim 1 wherein said sealing structure at the inlet side of the turbine comprises an annular, axially extending flange formed on the inlet face of the turbine rotor; a sealing portion cooperating with a portion of said flange; and a mounting portion extending axially from said sealing portion into abutting engagement with and being secured to the end of the compressor casing whereby the hub of said turbine rotor, the rotor shaft and said sealing portion form a dead air chamber; and an annular, radially expansible element secured to said mounting portion in surrounding relation thereto and having a portion thereof sloping outwardly into sealing engagement with the turbine casing and forming together with said sealing structure a closure wall defining a pressure chamber communicating with said turbine clearances.

5. The combination defined in claim 4 wherein said other end of said fluid conduit is mounted in said sealing portion in communication with said pressure chamber.

References Cited in the file of this patent

UNITED STATES PATENTS

| | | |
|---|---|---|
| 1,926,225 | Birmann | Sept. 12, 1933 |
| 1,959,703 | Birmann | May 22, 1934 |
| 2,112,391 | Anxionnaz | Mar. 29, 1938 |
| 2,141,401 | Martinka | Dec. 27, 1938 |
| 2,364,189 | Büchi | Dec. 5, 1944 |
| 2,390,506 | Büchi | Dec. 11, 1945 |
| 2,401,826 | Halford | June 11, 1946 |
| 2,488,867 | Judson | Nov. 22, 1949 |
| 2,532,721 | Kalitinsky | Dec. 3, 1950 |
| 2,647,684 | Lombard | Aug. 4, 1953 |